United States Patent
Sheikhha et al.

(10) Patent No.: US 8,226,144 B2
(45) Date of Patent: Jul. 24, 2012

(54) MOTOR VEHICLE WITH EXTENDIBLE VEHICLE BODY

(75) Inventors: Mohammad Hossein Sheikhha, München (DE); Gerald Lackner, Münsing (DE); Frank Seifert, Neuried (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 98 days.

(21) Appl. No.: 12/823,293

(22) Filed: Jun. 25, 2010

(65) Prior Publication Data

US 2011/0169290 A1 Jul. 14, 2011

(30) Foreign Application Priority Data

Jun. 25, 2009 (DE) .......................... 10 2009 030 630

(51) Int. Cl.
*B62D 27/00* (2006.01)
(52) U.S. Cl. .................................. 296/26.08; 296/26.09
(58) Field of Classification Search ............... 296/26.01, 296/26.02, 26.03, 26.08, 26.09, 146.13
See application file for complete search history.

(56) References Cited

U.S. PATENT DOCUMENTS

| | | | | |
|---|---|---|---|---|
| 4,886,411 A | * | 12/1989 | Pieperhoff et al. | 414/408 |
| 4,887,859 A | * | 12/1989 | Aper | 296/26.08 |
| 6,257,651 B1 | * | 7/2001 | Morbach et al. | 296/146.13 |

FOREIGN PATENT DOCUMENTS

| | | |
|---|---|---|
| DE | 4220438 A1 | 12/1993 |
| DE | 4413970 C1 | 9/1995 |
| DE | 29508400 U1 | 9/1995 |
| DE | 4418242 A1 | 12/1995 |
| DE | 19731866 C1 | 12/1998 |
| EP | 1167167 A2 | 1/2002 |

* cited by examiner

*Primary Examiner* — Dennis Pedder
*Assistant Examiner* — Jason S Daniels
(74) *Attorney, Agent, or Firm* — Henry M. Feiereisen; Ursula B. Day

(57) ABSTRACT

A motor vehicle includes a body having an enclosed passenger cell which is accessible by a door and forms a component of a front body part and a rear body part. The front and rear parts are movable in length direction of the motor vehicle relative to one another to change a length dimension of the motor vehicle. A covering module covers a gap in the passenger cell between the front and rear body parts.

6 Claims, 3 Drawing Sheets

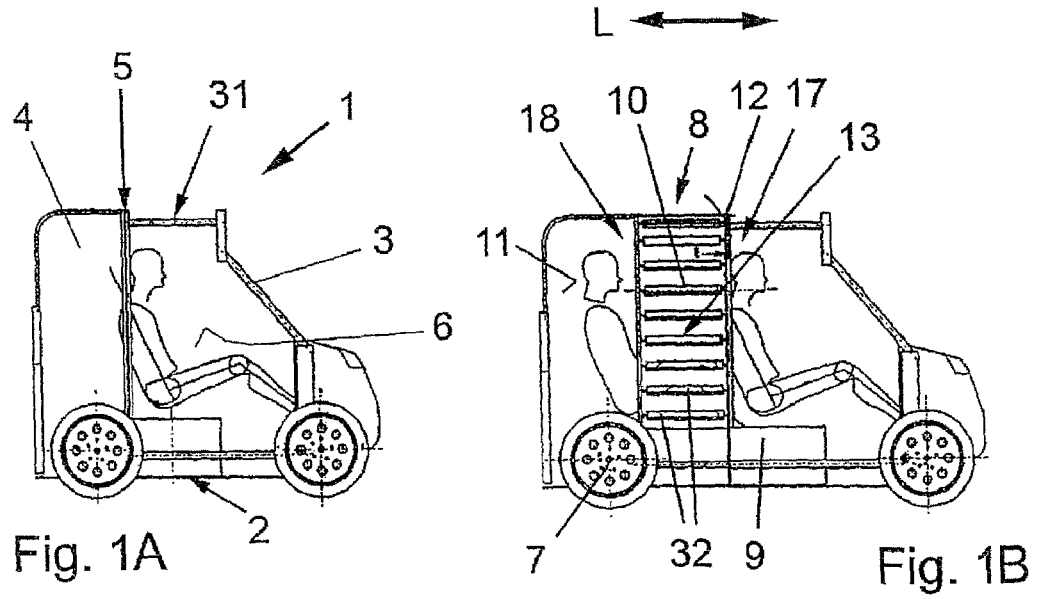
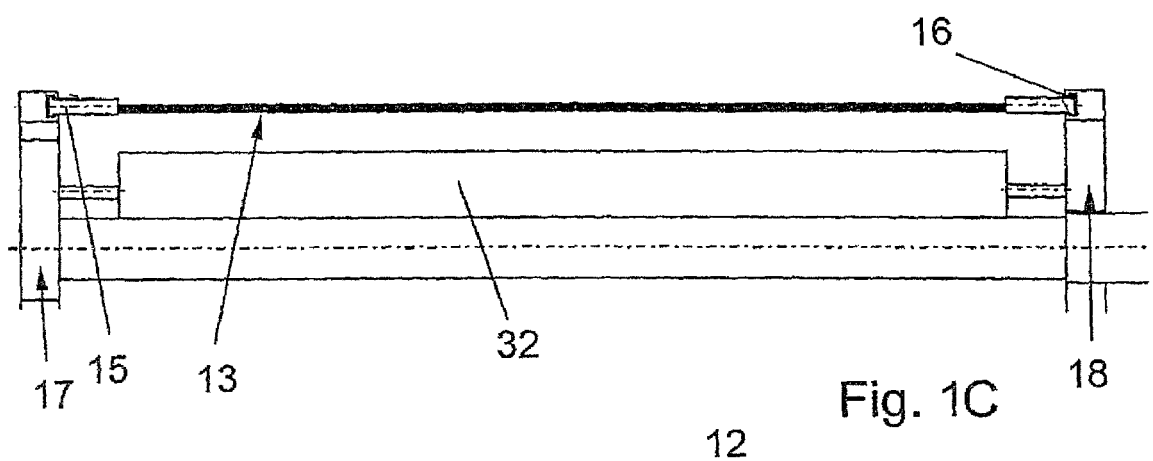
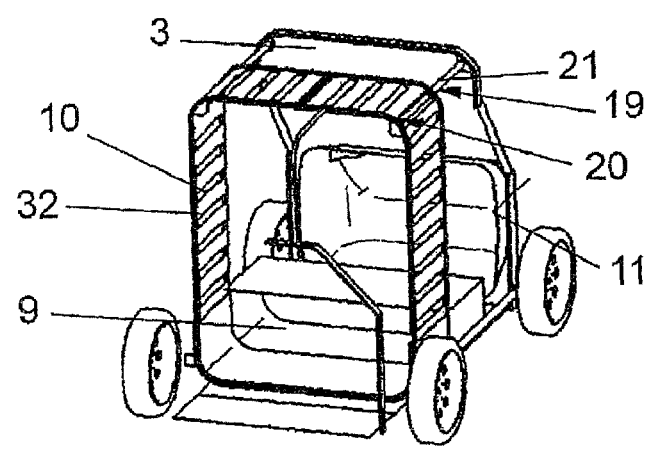

MOTOR VEHICLE WITH EXTENDIBLE VEHICLE BODY

CROSS-REFERENCES TO RELATED APPLICATIONS

This application claims the priority of German Patent Application, Serial No. 10 2009 030 630.7-21, filed Jun. 25, 2009, pursuant to 35 U.S.C. 119(a)-(d), the content of which is incorporated herein by reference in its entirety as if fully set forth herein.

BACKGROUND OF THE INVENTION

The present invention relates, in general, to the field of motor vehicles.

The following discussion of related art is provided to assist the reader in understanding the advantages of the invention, and is not to be construed as an admission that this related art is prior art to this invention.

Motor vehicles are known of single-seater type or multi-seater type with varying loading capacity. The length of the motor vehicles is hereby unchangeably fixed by the manufacturer. As a result, many motor vehicles are selected in dependence on the number of seats or loading capacity that is needed at a maximum. However, oftentimes the capacity is not fully utilized during daily use. In particular when city traffic is involved, there is a need to be able to shorten the motor vehicle, when for example the rear seat is not occupied.

The firm Rinspeed developed a prototype of a roadster, called Presto, that can be transformed from a two-seater to a four-seater with room for two further rear seats by shifting the rear body part in relation to the front body part. Because of the open configuration of the roadster, there are drawbacks as the roadster cannot be closed and, as the vehicle body is movable within one another, there are no doors so that the vehicle can be entered only by jumping from outside into the interior of the vehicle.

It would therefore be desirable and advantageous to provide an improved motor vehicle which obviates prior art shortcomings and which has a variable seating capacity despite a closed configuration while allowing comfortable entry.

SUMMARY OF THE INVENTION

According to one aspect of the present invention, a motor vehicle includes a body having an enclosed passenger cell accessible by a door and forming a component of a front body part and a rear body part, with the front and rear parts being movable in length direction of the motor vehicle relative to one another to change a length dimension of the motor vehicle, and a covering module to cover a gap in the passenger cell between the front and rear body parts.

The motor vehicle has a closed vehicle body comprised of front and rear body parts, wherein the vehicle and the body can be stretched by moving a rear axle, suitably with drive unit, in length direction of the vehicle. The passenger cell of the body has a closed configuration, extending over both body parts. As the rear axle and the pertaining drive unit are moved, the rear body part is shifted in relation to the front body part. The front body part is provided on both its length sides with a door for allowing an occupant to enter the vehicle. The gap that forms between the front and rear body parts, as the vehicle is stretched, is closed by the covering module to protect the occupant(s) in bad weather and to reinforce the vehicle body.

According to another advantageous feature of the present invention, the covering module may be constructed in the form of a blind. The blind is comprised of slats which are connected to one another and designed as elongated plates that are articulated to one another. Guides can be provided along confronting end regions of the front and rear body parts for engagement of the ends of the slats. Advantageously, the guides are arranged on confronting end faces and extend from an area underneath the body via the length sides and the roof. Once the rear axles with the associated drive unit and the rear body part have been moved in length direction of the motor vehicle, the blind, for example two blind components on both sides of the motor vehicle, respectively, is drawn from the underfloor region of the vehicle and guided to the roof. Both components of the blind are united in midsection of the roof and coupled together. Before the motor vehicle is shortened, the blind is stowed in the underfloor zone again.

It is, of course, also conceivable to construct the blind in one piece so that the blind is pulled from one length side of the motor vehicle across the roof to the other length side and from there again to the floor of the vehicle for anchoring.

According to another advantageous feature of the present invention, the slats may be reinforced. In this way, the occupant(s) can be protected also in the free section between the front and rear body parts.

Depending on its width, the gap between the front and rear body parts may also be utilized for entering and exiting, when the motor vehicle is stretched.

According to another advantageous feature of the present invention, the covering module may be configured analogous to the rear body part and include a roof and two side walls. The covering module has hereby a width which corresponds to the free section, when the motor vehicle is stretched. Advantageously, the confronting end regions of the front and rear body parts overlap, at least partly, with the covering module. When the motor vehicle is shortened, the covering module may be arranged inside or outside of the rear body part.

In order to extend the motor vehicle, the rear body part is moved jointly with the rear axle and the associated drive unit in relation to the front body part and in relation to the covering module in length direction of the motor vehicle. In the event, the covering module is arranged inside the rear body part, the covering module is pulled out from the rear vehicle part, as the motor vehicle is stretched. In the event, the covering module is arranged outside the body part, the rear body part is pulled out from the covering module, as the motor vehicle is stretched. The end region of the covering module is hereby firmly secured to the end region of the front body part, pointing toward the rear body part. A locking mechanism may be provided between the end region, pointing toward the front body part, and the end region, pointing to the rear body part, of the covering module.

Of course, the covering module may also be arranged in the front body part and pulled out from there. As doors are provided in the front body part, the covering module can, however, more easily be integrated in the rear body part.

According to another advantageous feature of the present invention, the covering module may be constructed between the front and rear body parts in the form of a flexible element, e.g. an expansion bellows, which can stretch, as the motor vehicle is extended. Reinforcement struts, e.g. metal bars, can be provided to extend between the front and rear body parts so as to reinforce the vehicle body.

Entry into the vehicle can be realized in a similar way as in three-door vehicles by forwardly tilting the front seats.

As a result of the afore-described construction, the motor vehicle can be manufactured lightweight and is therefore applicable for propulsion by an electric motor.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1A is a schematic illustration of one embodiment of a motor vehicle according to the present invention in shortened configuration, with a blind as covering module;

FIG. 1B is a schematic illustration of the motor vehicle in stretched configuration;

FIG. 1C is a schematic illustration of slats of the blind received in guides;

FIG. 1D is a rear perspective view of the motor vehicle, without illustration of a rear body part;

DETAILED DESCRIPTION OF PREFERRED EMBODIMENTS

Figure 2A:
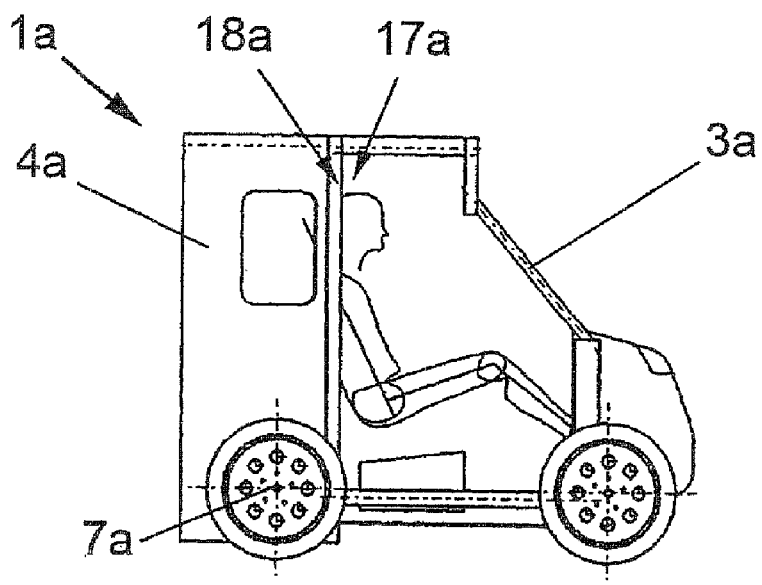
FIG. 2A is a schematic illustration of another embodiment of a motor vehicle according to the present invention in shortened configuration, with fixed covering module.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1A, there is shown a schematic illustration of one embodiment of a motor vehicle according to the present invention, generally designated by reference numeral 1 having a vehicle body 2, shown here in shortened configuration. The body 2 has a front body part 3 and a rear body part 4 which are linked to one another by a locking mechanism 5. Arranged on both length sides of the front body part 3 are doors 6, respectively. The body 2 has a closed configuration, i.e. it includes an enclosed passenger cell 31 with fixed roof structure.

FIG. 1B shows the motor vehicle 1 with extended body 2. This is realized by moving the rear axle 7 with drive unit and the rear body part 4 in relation to the front body part 3 in length direction L of the motor vehicle 1. As a result, a gap 8 is formed between the front body part 3 and the rear body part 4. To close the gap 8, a covering module in the form of a blind 10, which is stowed in the underfloor 9 of the body 2, is pulled upwards and closed in midsection of the roof 12. The blind 10 is comprised of several slats 13 which are hinged to one another along the length sides 14 and have ends 15 that engage in guides 16 on confronting end regions 17, 18 of the front and rear body parts 3, 4, respectively, as shown in FIG. 1C.

The front and rear body parts 3, 4 have upper confronting end regions 19, 20, respectively, which are coupled by braces 21 in the form of bars that are drawn from the front and/or rear body part 3, 4 during stretching and provide support for the blind 10, as shown in FIG. 1D.

The single slats 13 may be reinforced in order to provide added stability of the vehicle body 2. It is also possible to render some of the slats 13 or slat sections 32 transparent for effecting a brighter interior space.

FIG. 2A is a schematic illustration of another embodiment of a motor vehicle according to the present invention, generally designated by reference numeral 1a. In the following description, parts corresponding with those in FIG. 1 will be identified, where appropriate for the understanding of the invention, by corresponding reference numerals followed by an "a". The motor vehicle 1a is shown here in shortened configuration and has a covering module 22 arranged inside the rear body part 4a. The covering module 22 includes side walls 23 which are connected via a roof 12, analogous to the construction of the rear body part 4a. The covering module 22 is at least as wide as the region 8a, when the motor vehicle 1a is stretched. The covering module 22 has an end region 18a which points toward the front body part 3a and is connected with the end region 17a of the front body part 3a, pointing toward the covering module 22.

Figure 2B:
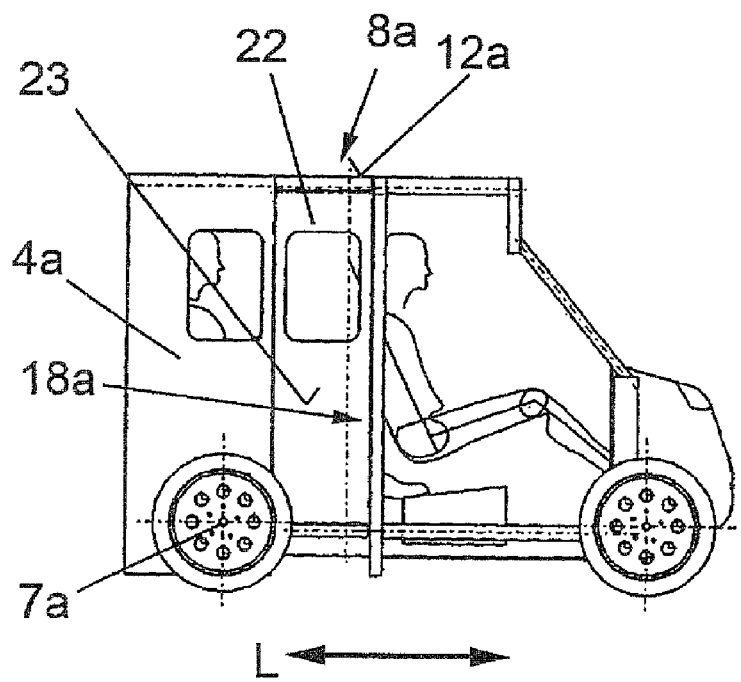
FIG. 2B is a schematic illustration of the motor vehicle of FIG. 2A in stretched configuration.

FIG. 2B shows the motor vehicle 1a in stretched state. The rear axle 7a with associated drive unit is moved jointly with the rear body part 4a in length direction L of the motor vehicle 1a. As a result, the rear body part 4a shifts in relation to the front body part 3a and in relation to the covering module 22. A locking mechanism may be provided between the end region 18a of the rear body part 4a, pointing toward the covering module 22, and the covering module 22.

This type of motor vehicle 1a with fixed covering module 22 has the advantage that the free region 8a between the front body part 3a and the rear body part 4a can be closed as the motor vehicle 1a extends so that the need for a second modification step is eliminated.

Figure 3A:
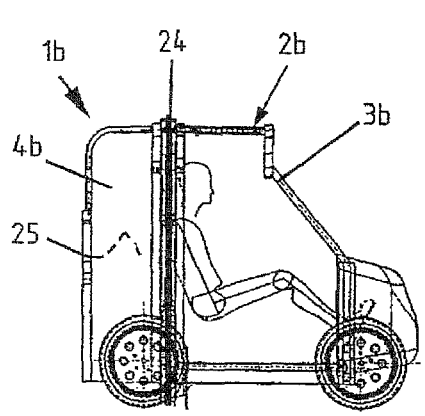
FIG. 3A is a schematic illustration of yet another embodiment of a motor vehicle according to the present invention in shortened configuration, with an expansion bellows as covering module.
Figure 3B:
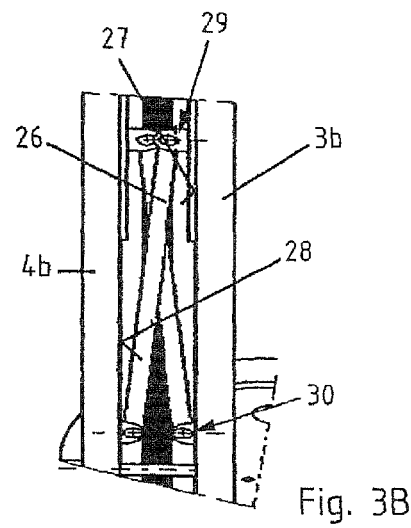
FIG. 3B is an enlarged detailed view of the interconnection between front and rear body parts of the motor vehicle of FIG. 3A, in shortened configuration.

FIG. 3A shows a schematic illustration of yet another embodiment of a motor vehicle according to the present invention, generally designated by reference numeral 1b. In the following description, parts corresponding with those in FIG. 1 will be identified, where appropriate for the understanding of the invention, by corresponding reference numerals followed by a "b". In this embodiment, the motor vehicle 1b has a covering module in the form of an expansion bellows 24. In the shortened or non-stretched state of the motor vehicle 1b, the expansion bellows 24 is fully collapsed and is located between the front body part 3b and the rear body part 4b. As an alternative, the expansion bellows 24 may also be arranged on the inner sides 25 of the body 2b so that the front body part 3b can be directly coupled with the rear body part 4b. Reinforcement struts 26 are provided between the front and rear body parts 3b, 4b for providing reinforcement (FIG. 3B). The reinforcement struts 26 are moveably arranged on confronting end faces 27, 28 of the front and rear body parts 3b, 4b, respectively, and extend from the front body part 3b to the rear body part 4*b*. As shown in FIGS. 3B and 3D, the reinforcement struts 26 advantageously cross one another. The reinforcement struts 26 have ends 29, 30 designed in the form of a carriage and slide in or on guide rails along the end faces 27, 28 of the front body part 3*b* and/or rear body part 4*b*, when the body 2*b* is stretched or shortened.

Figure 3C:
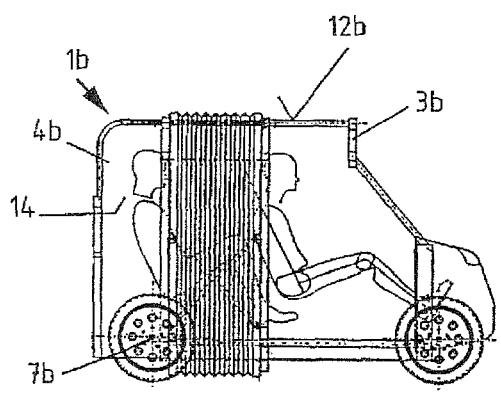
FIG. 3C is a schematic illustration of the motor vehicle of FIG. 3A in stretched configuration.
Figure 3D:
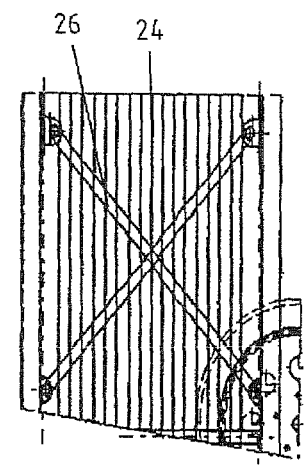
FIG. 3D is an enlarged detailed view of the interconnection between front and rear body parts of the motor vehicle of FIG. 30, in stretched configuration.
Figure 3E:
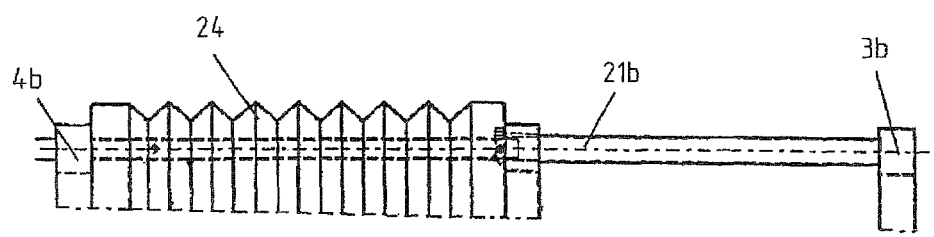
FIG. 3E is an enlarged detailed view of the expansion bellows.

When the motor vehicle 1*b* is extended, as shown in FIG. 3C, the expansion bellows 24 is stretched between the front body part 3*b* and the rear body part 4*b*. The distance of the ends 29, 30 of the reinforcement struts 26 is less than the distance of the ends 29, 30 of the reinforcement struts 26, when the motor vehicle 1*b* assumes the shortened state. The expansion bellows 24 is supported in the transition zone between length side 14 and roof 12*b*, similar as in the embodiment of the covering module as blind 10, by braces 21*b*, as shown in FIG. 3E. The braces 21*b* provides added reinforcement when the body 2*b* is stretched.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A motor vehicle, comprising:
   a body having an enclosed passenger cell accessible by a door and forming a component of a front body part and a rear body part, said front and rear parts being movable in length direction of the motor vehicle relative to one another to change a length dimension of the motor vehicle;
   a covering module to cover a gap in the passenger cell between the front and rear body parts, said covering module being constructed as a blind including slats having opposite ends, and
   guides provided in confronting end regions of the front and rear body parts for engagement of the ends of the slats,
   wherein the slats of the blind are received in an underfloor zone, when the body assumes a shortened configuration, and capable of moving out, after extending the body.

2. The motor vehicle of claim 1, wherein the slats are reinforced.

3. The motor vehicle of claim 1, wherein the slats are hingedly connected to one another on their length sides.

4. A motor vehicle, comprising:
   a body having an enclosed passenger cell accessible by a door and forming a component of a front body part and a rear body part, said front and rear parts being movable in length direction of the motor vehicle relative to one another to change a length dimension of the motor vehicle;
   a covering module to cover a gap in the passenger cell between the front and rear body parts, said covering module being constructed as a blind including slats having opposite ends, and
   guides provided in confronting end regions of the front and rear body parts for engagement of the ends of the slats,
   wherein the body has a roof, said guides extending across length sides of the body and the roof.

5. The motor vehicle of claim 4, wherein the slats are reinforced.

6. The motor vehicle of claim 4, wherein the slats are hingedly connected to one another on their length sides.

* * * * *

UNITED STATES PATENT AND TRADEMARK OFFICE
CERTIFICATE OF CORRECTION

| | |
|---|---|
| PATENT NO. | : 8,226,144 B2 |
| APPLICATION NO. | : 12/823293 |
| DATED | : July 24, 2012 |
| INVENTOR(S) | : Mohammad Hossein Sheikhha et al. |

It is certified that error appears in the above-identified patent and that said Letters Patent is hereby corrected as shown below:

Column 3, BRIEF DESCRIPTION OF THE DRAWING, FIG. 3D, change FIG. 30 to "FIG. 3C".

Signed and Sealed this
Eighteenth Day of September, 2012

David J. Kappos
*Director of the United States Patent and Trademark Office*